US009916829B2

(12) United States Patent
Beckford et al.

(10) Patent No.: US 9,916,829 B2
(45) Date of Patent: Mar. 13, 2018

(54) VOICE SEARCH AND RESPONSE BASED ON RELEVANCY

(71) Applicant: HOME DEPOT PRODUCT AUTHORITY, LLC, Atlanta, GA (US)

(72) Inventors: Ian O'Neal Beckford, Atlanta, GA (US); Michael L. Guhl, Marietta, GA (US); Anees Haidri, Smyrna, GA (US); Kevin James Scholz, Marietta, GA (US); Paul Sterk, Rochester, MI (US)

(73) Assignee: Home Depot Product Authority, LLC, Atlanta, GA (US)

( * ) Notice: Subject to any disclaimer, the term of this patent is extended or adjusted under 35 U.S.C. 154(b) by 163 days.

(21) Appl. No.: 13/968,225

(22) Filed: Aug. 15, 2013

(65) Prior Publication Data

US 2014/0052445 A1   Feb. 20, 2014

Related U.S. Application Data

(60) Provisional application No. 61/683,393, filed on Aug. 15, 2012.

(51) Int. Cl.
*G10L 15/00* (2013.01)
*G10L 15/22* (2006.01)
*G06F 17/30* (2006.01)

(52) U.S. Cl.
CPC ........ *G10L 15/22* (2013.01); *G06F 17/30979* (2013.01); *G10L 15/00* (2013.01)

(58) Field of Classification Search
CPC .............................. G10L 15/22; G10L 15/265
USPC ........................................ 704/231, 270, 275
See application file for complete search history.

(56) References Cited

U.S. PATENT DOCUMENTS

| | | | |
|---|---|---|---|
| 6,269,153 B1 * | 7/2001 | Carpenter | H04M 1/645 379/88.02 |
| 6,434,549 B1 * | 8/2002 | Linetsky | G06F 17/30861 707/719 |
| 7,409,221 B2 * | 8/2008 | Obradovich et al. | 455/457 |
| 7,724,889 B2 * | 5/2010 | Bushey et al. | 379/265.02 |
| 8,219,558 B1 * | 7/2012 | Trandal et al. | 707/736 |
| 2001/0047261 A1 * | 11/2001 | Kassan | G10L 15/30 704/270 |
| 2002/0087522 A1 * | 7/2002 | MacGregor et al. | 707/3 |
| 2002/0116176 A1 * | 8/2002 | Tsourikov | G06F 17/2785 704/9 |
| 2004/0044516 A1 * | 3/2004 | Kennewick | G10L 15/22 704/5 |

(Continued)

OTHER PUBLICATIONS

Office Action Received in Canadian Counterpart Application No. 2823835 dated May 4, 2016.

(Continued)

*Primary Examiner* — Shaun Roberts
(74) *Attorney, Agent, or Firm* — Greenberg Traurig, LLP

(57) ABSTRACT

A user seeking information relevant to the purchase of a home improvement product or other product submits a query to an automated system. The system transforms the user's voice query into a text statement and searches a knowledge base for candidate responses. Quality scores for the candidate responses are determined. If no candidate response having at least a minimum quality score is identified, the query is sent to a second device associated with an agent. The agent response is provided to the user and stored in the knowledge base for future use.

19 Claims, 3 Drawing Sheets

(56) References Cited

U.S. PATENT DOCUMENTS

| | | |
|---|---|---|
| 2004/0162724 A1* | 8/2004 | Hill .................... G10L 15/22 704/231 |
| 2005/0097005 A1* | 5/2005 | Fargo .............................. 705/26 |
| 2006/0173886 A1* | 8/2006 | Moulinier ......... G06F 17/30616 |
| 2008/0154608 A1* | 6/2008 | Evermann et al. ........ 704/270.1 |
| 2009/0052636 A1* | 2/2009 | Webb et al. ................ 379/88.14 |
| 2009/0304161 A1* | 12/2009 | Pettyjohn et al. ......... 379/88.01 |
| 2010/0076843 A1* | 3/2010 | Ashton ...................... 705/14.51 |
| 2011/0288851 A1* | 11/2011 | Duan ................................ 704/3 |

OTHER PUBLICATIONS

Canadian office action received in related application No. 2,823,835, dated Apr. 19, 2017, four pages.

* cited by examiner

VOICE SEARCH AND RESPONSE BASED ON RELEVANCY

CROSS-REFERENCE TO RELATED APPLICATIONS

The present application claims the benefit of priority to U.S. Provisional Application Ser. No. 61/683,393, filed Aug. 15, 2012. The entire contents of that application are incorporated by reference.

BACKGROUND

Consumers often enter stores without a clear notion of what particular product they would like to purchase or that they may need to complete a home project. Most consumers utilize phones, tablets, or other web-capable devices to obtain product information or review information. In addition, store personnel sometimes lack expertise in a specific subject matter relevant to a consumer's product search or home project. Store personnel also may not have information about product location and may need to look up product or inventory data for a specific product. In some cases, such as home improvement needs, a consumer may desire more information about how to select and use products (including services) to undertake specific projects.

It would be useful to a consumer to have better access to more information about products, inventory and other subject pertinent to making a purchase decision.

BRIEF SUMMARY

According to an implementation of the disclosed subject matter, a voice query may be received from a user from a first device. The voice query may be converted to a text statement. A knowledge base may be queried based on the text statement. A response may be received from the knowledge base. A quality score for the response may be determined. The quality score may be determined to be below a threshold value. The text statement may be sent to a second device. The second device may be associated with an agent. A response statement may be received from the second device. The response statement may be provided to the first device. The response statement may be stored in the knowledge base.

The response from the knowledge base may be based on a natural language analysis of the voice query, searching the knowledge base to detect at least one keyword or it may be a comparison of one or more words associated with the voice query or text statement to one or more words associated with an answer in the knowledge base.

A response from the knowledge base or a response statement from the agent may include the inventory of an item. The inventory of the item may be determined based on information contained in the knowledge base or an inventory database. Similarly, a response from the knowledge base or a response statement from the agent may include the location of an item. The location of an item may be determined based on information contained in the knowledge base or a planogram database. Queries may be analyzed to determine frequently asked questions or other user data (e.g., date and time of query, location of query, store in which query was made, subject matter of query, etc.).

The first or second device may be a computing device such as, a tablet, a phone, a smartphone, a two-way radio, a computer, a pager, and a laptop. The first device and the second device may be in communication with one another. For example, a user may speak a question into the first device. The voice query or the converted text statement may be sent to a second device that may be operated by an agent. The agent may view the text statement on the second device or respond to the first user directly (e.g., voice communication).

The knowledge base may be updated and adapted based on queries received and response statements provided. It may also be updated by entering information that is unrelated to a query or a response statement. For example, a new product may be carried by a store. Information pertaining to the new product may be populated into the knowledge database. In another example, the location or inventory of a product may change over time.

An evaluation of a response statement may also be made. For example, a query regarding similar or the same subject matter may be made multiple independent times. A response to the query may be unavailable in the knowledge database. Multiple agents may respond to the queries, each with slight different response statements. The response statements may be collected, stored, or both collected and stored in a database. At a later date, the response statements may be evaluated for their quality in relation to the question asked. In another configuration, a rating may be provided by one or more users. In another configuration, a rating may be based on a determination of the response most frequently viewed when the query is received. The responses may also be combined and/or consolidated.

In an embodiment, a determination may be made as to whether a response from the knowledge base is above a specified threshold quality score. A high quality score may reflect an answer or response statement that is determined to be relevant or useful to a user for a query. A quality score may be determined based on comparing one or more words in the potential answers or response statement to one or more words in the query. A quality score may incorporate geographic location. The quality score may be based on a user rating (e.g., rating whether or not the answer was helpful) or whether a user performed a follow-up search regarding similar subject matter. A threshold value may be configured by an administrator (i.e., person in control of the database) or the threshold value may be automatically set based on the available response statements or answers.

According to an embodiment, system that includes a knowledge database for storing text statements and response statements may be connected to a processor. The processor, for example, may be part of a server that is either part of the database or connected to it over a network. The processor may be configured to receive a voice query from a user from a first device. It may convert the voice query to a text statement. The process may query a knowledge base based on the text statement. It may receive a response from the knowledge base and determine a quality score for the response. The processor may determine that the quality score is below a threshold value and send the text statement to a second device. The second device may be associated with an agent. The processor may receive a response statement from the second device. It may provide the response statement to the first device. Optionally, the response statement may be stored in the knowledge base or other database where it may be evaluated for its quality.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
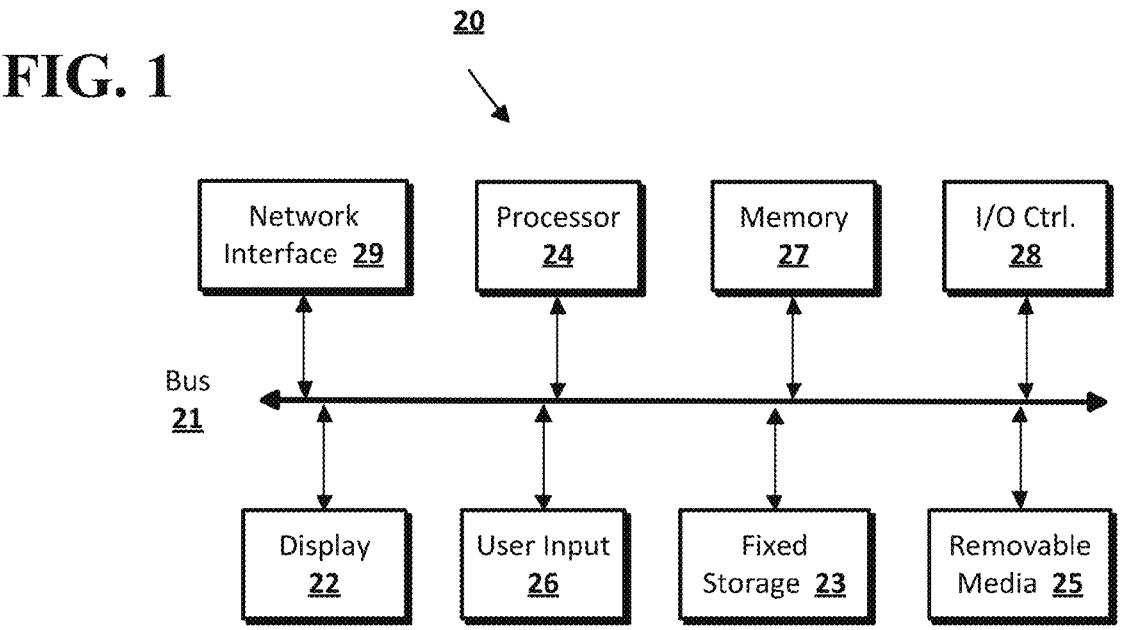
FIG. 1 shows a computer according to an implementation of the disclosed subject matter.

The disclosed subject matter proposes techniques and arrangements that allow a consumer to obtain an answer for a query from either a knowledge base or speak to an agent. The knowledge base may be updated to reflect answers to questions such that an answer provided to a first user by an agent may be provided to a second user automatically. An example configuration includes a phone being present in a store. A user may access the phone and pose a query. The query may be received and analyzed by voice recognition software. The voice recognition software may convert the received voice data into a text statement. The text statement may, for example, be received by a server that compares the statement to a database containing information related to products or the text statement may be sent to a database for processing (e.g., comparing one or more keywords contained in the text statements to the database). The database may provide a response to the query and the response may be evaluated to obtain a quality score (more detail is provided below). Depending on the quality score, the response from the database may be passed to a user device or it may be sent to an agent device. The agent may then amend the response, provide a new response, or redirect the query for a response.

In some instances, natural language queries may be received by the user device. The response from the knowledge base may be based on a natural language analysis of the voice query, searching the knowledge base to detect at least one keyword or it may be a comparison of one or more words associated with the voice query or text statement to one or more words associated with an answer in the knowledge base.

A response from the knowledge base or a response statement from the agent may include the inventory of an item. The inventory of the item may be determined based on information contained in the knowledge base or an inventory database. Similarly, a response from the knowledge base or a response statement from the agent may include the location of an item. The location of an item may be determined based on information contained in the knowledge base or a planogram database. Queries may be analyzed to determine frequently asked questions or other user data (e.g., date and time of query, location of query, store in which query was made, subject matter of query, etc.).

The first or second device may be a computing device such as, a tablet, a phone, a smartphone, a two-way radio, a computer, a pager, and a laptop. The first device and the second device may be in communication with one another. For example, a user may speak a question into the first device. The voice query or the converted text statement may be sent to a second device that may be operated by an agent. The agent may view the text statement on the second device or respond to the first user directly (e.g., voice communication). Either the first or second device, for example, may have an interface that allows the user to access a microphone connected to the device (or that is integrated with the device). For example, the user may make a query using a tablet that, when the user selects a button to make a query, opens up a microphone interface that listens for the user queries. The interface may also be voice interactive. For example, a user may be speak commands that are recognized by the system (e.g., send, transmit, hang-up).

The knowledge base may be updated and adapted based on queries received and response statements provided. It may also be updated by entering information that is unrelated to a query or a response statement. For example, a new product may be carried by a store. Information pertaining to the new product may be populated into the knowledge database. In another example, the location or inventory of a product may change over time.

An evaluation of a response statement may also be made. For example, a query regarding similar or the same subject matter may be made multiple independent times. A response to the query may be unavailable in the knowledge database. Multiple agents may respond to the queries, each with slight different response statements. The response statements may be collected, stored, or both collected and stored in a database. At a later date, the response statements may be evaluated for their quality in relation to the question asked. In another configuration, a rating may be provided by one or more users. In another configuration, a rating may be based on a determination of the response most frequently viewed when the query is received.

In an embodiment, a determination may be made as to whether a response from the knowledge base is above a specified threshold quality score. A high quality score may reflect an answer or response statement that is determined to be relevant or useful to a user for a query. A quality score may be determined based on comparing one or more words in the potential answers or response statement to one or more words in the query. A quality score may incorporate geographic location. The quality score may be based on a user rating (e.g., rating whether or not the answer was helpful) or whether a user performed a follow-up search regarding similar subject matter. A threshold value may be configured by an administrator (i.e., person in control of the database) or the threshold value may be automatically set based on the available response statements or answers.

For example, a user may speak a request for fertilizer for pets into a phone. The phone may have an automated response system that welcome's the user or introduces the user to the system. The voice query may be received by a private branch exchange ("PBX") and forwarded to, for example, a voice recognition and conversion system. The voice conversion system may convert the voice query into a text statement. The text statement may be used to query a knowledge database. The text statement may be sent to a server that manages the interchange of information between the voice recognition system and the database over a network. The knowledge database may be updated with information in real-time. It may contain information related to products or other items, promotions, location information, inventory, answers to questions. In the present example, the key words "pet" and "fertilizer" may be compared to the questions and answers available in the knowledge database. If the database is able to determine one or more potential matches, a quality score may be determined. The quality score may also utilize a natural language processing component in some configurations to assist in determining one or more answers. For example, a high quality score result may contain both the words "pet" and "fertilizer." A high quality score may also locate an instance where a similar question, utilizing a similar composition of words and sentence structure (e.g., phrasing), was used and return the answer provided to that question.

If the knowledge database is unable to locate an answer that satisfies the quality score threshold, it may indicate to the server that no answers are available for the present query. The server may then connect to a second device, e.g., a phone, and provide either the original voice query (e.g., the voice query may be sent to the server in addition to the voice recognition system) or the text statement. The second device may be controlled or operated by an agent. The agent may be a service provider, contractor, store employee, etc. The agent may utilize other databases or resources at their disposal (including, for example, personal knowledge) in an attempt to locate an answer for the user. The agent may enter the response into the second device or may speak the answer directly to the user. The entered response may be used to update the knowledge database such that subsequent queries regarding the same subject matter may return the provided answer.

The user may have the ability to rate the answer or response statement. The rating may be used to determine a quality score for future queries. The agent's response statement may also be reviewed or rated by other individuals related to the store. The response statement may be rated on, for example, clarity, relevance to the query asked, utility, etc. Response statements may receive review prior to being sent to the user. That is, they may enter a queue that is reviewed by another individual.

In an implementation, the data passed through the disclosed system may be analyzed in a number of ways. For example, a store may determine that consumers are searching for a particular product that it currently does not carry based on the number of queries it has received. Analysis may also be performed on the type of questions that are asked by consumers. The response value to a user's query may also be evaluated (e.g., how often did user's feel the information provided was helpful or useful). Purchase correlations may also be made between product queries and sales.

In an embodiment a template response may be generated to a query. The type of query may be analyzed based on an analysis of the words and sentence structure in the query. For example, a query asking, "where is product X?" may result in a different template response compared to a question such as, "what product does X?" Template responses may use information contained in the knowledge database. Templates for responses may be stored in a separate database. The advantage of a template response is that every user posing a similar question receives a consistent response (the information in the response may be different or updated depending on the query).

In some configurations, a machine learning algorithm may be used to modify the knowledge database, to interact with users, to respond to user queries, to convert voice into a text statement, to determine whether the user should be connected to an agent, and to determine what type of agent the user should be connected to (e.g., a person with knowledge of product information, a contractor, a service provider, etc.). Such an algorithm may be used to evaluate queries, answers, or response statements and determine whether the answer or response statement is auto-populated.

In a configuration the user may be connected to a service provider. For example, a user may have a query regarding a window installation. The user may have a query about products regarding the window installation. The system may recognize that the user may benefit from speaking to a window installer either to answer specific questions or to perform the installation for the user. For example, the user may simply inquire about having a professional perform the window installation. The system may also recognize, based on the nature of the questions that the user would benefit from being connected to a professional (e.g., the user is making what is determined to be basic questions for window installation).

According to an embodiment, a system that includes a knowledge database for storing text statements and response statements may be connected to a processor. The processor, for example, may be part of a server that is either part of the database or connected to it over a network. The processor may be configured to receive a voice query from a user from a first device. It may convert the voice query to a text statement. The process may query a knowledge base based on the text statement. It may receive a response from the knowledge base and determine a quality score for the response. The processor may determine that the quality score is below a threshold value and send the text statement to a second device. The second device may be associated with an agent. The processor may receive a response statement from the second device. It may provide the response statement to the first device. Optionally, the response statement may be stored in the knowledge base or other database where it may be evaluated for its quality.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
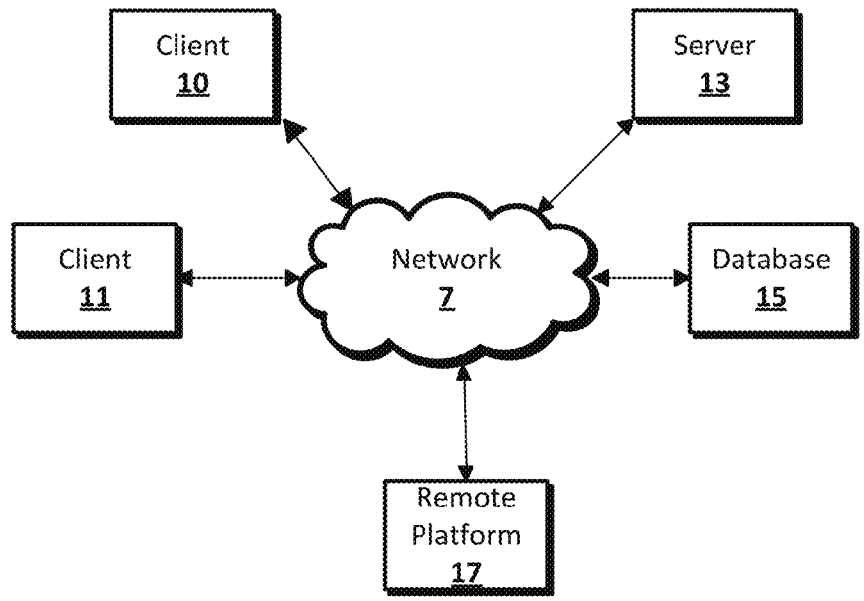
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
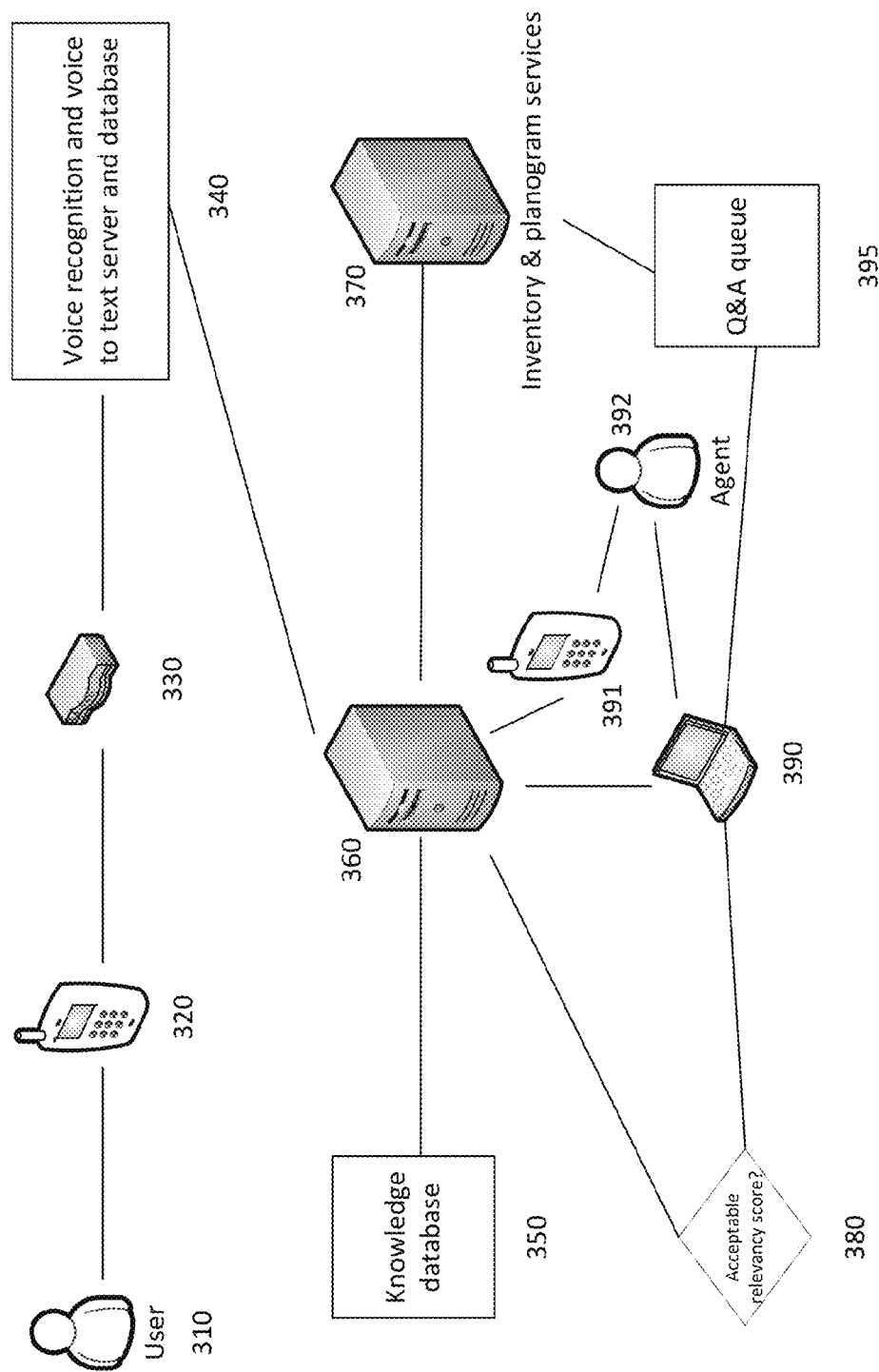
FIG. 3 is an example configuration of databases, devices, and a server according to an embodiment of the disclosed subject matter.

An example configuration of devices, a database, and a server are shown in FIG. 3. A user 310 may input a query into a user device 320 such as a smartphone. The query, for example, may be a voice query or typed into the user device 320. The query may be received by a PBX 330 to which the user device 320 is connected. A voice recognition analysis may proceed at 340. This may be performed on board the server 360 or it may be performed by a separate system (e.g., sent out to a separate server and provided to the server 360 associated with the system). The server 360 may receive a text statement that is used to query a knowledge database 350. In some instances, the knowledge database 350 may not have an answer that satisfies a threshold relevancy score value 380. In those instances, the server may send the text statement to an agent device 391. The agent 392 may view the text statement on the agent device 391 and utilize, for example, a separate device 390 to query other resources available to the agent 392 (e.g., the knowledge database, 350, the inventory & planogram database 370, interne resources such as online websites or forums, or manufacturers' reference materials). The agent's 392 response may be sent to a Q&A queue 395 where the agent's response may be evaluated. The response may also be returned through the server 360 to the user's device 320. The agent's device 391 may also be connected directly to the user's device 320 through the server 360 and PBX 330 to allow the agent 392 to communicate with the user 310 through text or speech.

Figure 4:
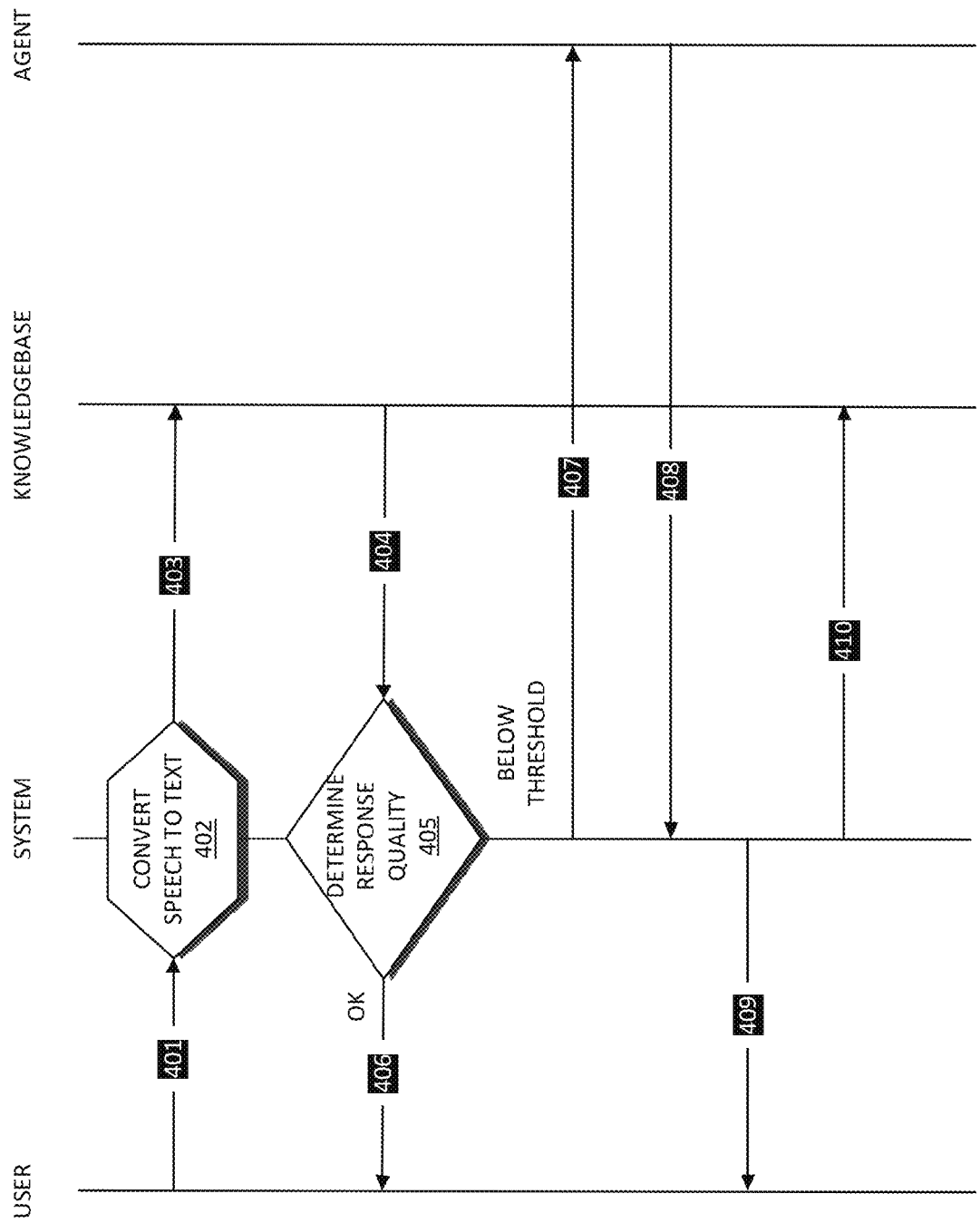
FIG. 4 is an example process flow according to an embodiment disclosed herein.

FIG. 4 shows the method in accordance with an embodiment of the disclosed subject matter. The system receives a user voice query from a smartphone, 401. The voice query is converted to a text statement, 402. The system queries a knowledge base based on the text statement, 403. The system receives a response from the knowledge base, 404, and determines a quality score for the response, 405. If the response quality score exceeds a threshold, it can be returned to the user, 406. If the response quality is below a threshold, the system can send the text statement to a device that is associated with an agent, 407. The system can receive a response statement from the agent device 408 and provide the agent's response statement to the user's smartphone, 409. The agent statement can be provided in any medium, including text, voice and video. The system can cause the agent response statement to be stored in the knowledge base, 410. The system can convert the agent statement from the format in which it is received into any other format suitable for rendering on the user device or storage in the knowledge base.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   receiving a first voice query from a first user from a first device;
   converting the first voice query to a corresponding text query;
   querying a knowledge base based on the text query;
   receiving a response from the knowledge base that at least partially answers the text query;
   determining a quality score for the response from the knowledge base that represents a degree to which the response from the knowledge base is determined to answer the text query;
   determining that the quality score is below a threshold value;
   sending the text query to a second device, the second device associated with an agent;
   receiving a response statement from the second device;
   providing the response statement to the first device;
   storing the response statement in the knowledge base with the response from the knowledge base;
   updating the quality score for the response from the knowledge base to increase the degree to which the response is determined to answer the text query in response to storing the response statement in the knowledge base;
   receiving a second voice query from a second user from a third device;
   providing the response statement from the knowledge base to the third device responsive to the second voice query;
   requesting a response rating from the second user of the third device for the response statement provided to the third device;
   receiving the response rating for the response statement provided to the third device from the second user of the third device; and
   updating the quality score for the response from the knowledge base with the response rating for the response statement received from the second user of the third device.

2. The method of claim 1, wherein the response from the knowledge base is based on a natural language analysis of the voice query.

3. The method of claim 1, wherein the response from the knowledge base is based on searching the knowledge base to detect at least one keyword that is associated with the subject matter of the voice query.

4. The method of claim 1, wherein the step of receiving a response from the knowledge base includes comparing one or more words associated with the voice query or text statement to one or more words associated with an answer in the knowledge base.

5. The method of claim 1, further comprising determining an inventory status of an item.

6. The method of claim 1, further comprising determining a location of an item.

7. The method of claim 1, further comprising analyzing a plurality of voice queries to determine a frequently asked question.

8. The method of claim 1, wherein the response statement comprises textual data.

9. The method of claim 1, wherein the second voice query regards the same subject matter as the first voice query.

10. A system comprising:
    a knowledge base for storing a plurality of text queries and a plurality of response statements;
    at least one processor connected to the knowledge base, the at least one processor configured to:
    receive a first voice query from a first user from a first device;
    convert the first voice query to a corresponding text query;
    query the knowledge base based on the text query;
    receive a response from the knowledge base that at least partially answers the text query;
    determine a quality score for the response from the knowledge base that represents a degree to which the response from the knowledge base is determined to answer the text query;
    determine that the quality score is below a threshold value;
    send the text query to a second device, the second device associated with an agent;
    receive a response statement from the second device that at least partially answers the text query;
    provide the response statement to the first device;
    store the response statement in the knowledge base with the response from the knowledge base;
    update the quality score for the response from the knowledge base to increase the degree to which the response is determined to answer the text query;
    receive a second voice query from a second user from a third device;
    provide the response statement from the knowledge base to the third device responsive to the second voice query;
    request a response rating from the second user for the response statement provided to the third device;
    receive the response rating from the second user of the third device; and
    updating the quality score for the response from the knowledge base with the received response rating from the second user of the third device.

11. The system of claim 10, wherein the response from the knowledge base is based on a natural language analysis of the voice query.

12. The system of claim 10, wherein the response from the knowledge base is based on searching the knowledge base to detect at least one keyword.

13. The system of claim 10, wherein the at least one processor configured to receive a response from the knowledge base includes the at least one processor configured to compare one or more words associated with the voice query or text query to one or more words associated with an answer in the knowledge base.

14. The system of claim 10, wherein the at least one processor is further configured to determine an inventory status of an item.

15. The system of claim 10, wherein the at least one processor is further configured to determine a location of an item.

16. The system of claim 10, wherein the at least one processor is further configured to analyze a plurality of voice queries to determine a frequently asked question.

17. The system of claim 10, wherein the response statement comprises textual data.

18. The system of claim 10, wherein the at least one processor is further configured to update the knowledge base based on the voice query.

19. The system of claim 10, wherein the second voice query regards the same subject matter as the first voice query.

* * * * *